3,164,577
PROPYLENE POLYMERIZATION CATALYST
Samuel Liebman, Silver Spring, and Frank X. Werber, Kensington, Md., assignors to W. R. Grace & Co., a corporation of Connecticut
No Drawing. Filed Oct. 12, 1960, Ser. No. 62,089
5 Claims. (Cl. 260—93.7)

The present invention relates to an improved catalyst and to its use in the polymerization of propylene. More particularly, it is directed to preparing a catalyst capable of producing polypropylene with a high percent isotacticity.

It is known in the art that propylene and other olefins can be polymerized in the presence of various catalysts consisting essentially of combinations of aluminum compounds such as aluminum alkyls, and aluminum alkyl halides, etc. and reducible heavy metal compounds such as the halides of the metals of Groups IV—VI of the Periodic System. An especially effective catalyst for the polymerization of propylene is titanium trichloride in combination with an aluminum alkyl, see for example, Belgian 543,259 issued to Montecatini et al.

Several different methods may be utilized in preparing $TiCl_3$. For example, the one most widely used is the vapor phase reduction of $TiCl_4$ with hydrogen.

$$2TiCl_4 + H_2 \rightarrow 2TiCl_3 + 2HCl$$

The immediate removal of HCl from the end product is essential to prevent the reformation of $TiCl_4$. Another method yielding similar results is the substitution of titanium powder in place of hydrogen under different conditions:

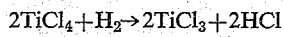
$$3TiCl_4(\text{liquid}) + Ti(\text{powder}) \rightarrow 4TiCl_3$$

Still another method includes the use of other metals, e.g., Mg, Zn, Al, As, Sb, in their powdered form as reducing agents. The most efficient of these is aluminum powder in the presence of traces of $AlCl_3$

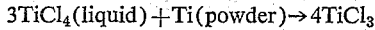
$$2TiCl_4 + Al \rightleftharpoons 2TiCl_3 + AlCl_3$$

with the resulting $AlCl_3$ separated from the $TiCl_3$ by back and forth distillation. One catalyst widely employed as an off-shoot of this aforesaid latter method is that wherein instead of removing the $AlCl_3$ it is permitted to co-crystallize with the $TiCl_3$, thus forming a $TiCl_3$—$AlCl_3$ complex. The resulting particles are then subjected to further treatment to increase activation; for example, ball milling. This co-crystallized $TiCl_3$—$AlCl_3$ complex catalyst when used in combination with an aluminum alkyl has an increased activity over the $TiCl_3$ aluminum alkyl co-catalyst mentioned in the aforesaid Belgian patent. However, although catalyst activity as measured by the formula (grams polymer/grams catalyst/reaction time in hours) is an important factor in selecting a catalyst for commercial use, another factor which must be taken into consideration is the percent isotacticity of the polypropylene produced by the catalyst system. High isotacticity content is important in polypropylene because it is in this region that crystallization occurs. Thus, the higher the isotactic content the higher the crystallinity which in turn yields enhanced properties, i.e., higher melting point, tensile strength, etc. The co-crystallized $TiCl_3$—$AlCl_3$ complex in combination with triethyl aluminum decreases the high percent isotacticity of the polypropylene below that obtained by the $TiCl_3$-aluminum trialkyl system disclosed in the Belgian patent.

Therefore, in light of the above, one object of the instant invention is to prepare a catalyst having high activity which will also yield polypropylene with a high percent isotacticity.

Surprisingly, it has now been found possible to substantially increase the isotactic content of polypropylene without substantially decreasing the activity of the catalyst by polymerizing propylene in the presence of a catalyst consisting essentially of an aluminum trialkyl in combination with the solid residue obtained after washing a co-crystallized $TiCl_3$—$AlCl_3$ complex with a mixture of an aluminum trialkyl wherein the alkyl groups contain 1-8 carbon atoms in a hydrocarbon solvent at a temperature in the range of 20-80° C. The increase in percent isotacticity of the polypropylene over that obtained using an unwashed catalyst of the same components is of the order of 50% or more without any substantial decrease in catalyst activity.

The reason for the increase in percent isotacticity is not known. One theory put forth is that the washing removes a significant portion of the exposed $AlCl_3$ which is suspected of acting as a chain transfer agent, thus leaving behind a highly active surface. However, applicants do not wish to be bound by any theory. Suffice it to say that washing of the co-crystallized $TiCl_3$—$AlCl_3$ complex with an aluminum trialkyl in a hydrocarbon solvent, separating the solid residue therefrom and combining same with triethyl aluminum results in a catalyst of high activity which yields polypropylene having a high isotactic content.

The $TiCl_3$—$AlCl_3$ complex of the instant invention is co-crystallized quantitatively in an evacuated sealed tube at about 300° C. in a mole ratio range of 3.5 to 2.5:1 respectively from the reaction

$$3TiCl_4 + Al + (\text{trace } AlCl_3) \rightarrow 3TiCl_3 + AlCl_3$$

as disclosed by O. Ruff and F. Neumann in Z. Anorg. Ch. 128, 81-95 (1923). The commercial co-crystallized $TiCl_3$—$AlCl_3$ complex used in the instant invention was produced by Stauffer Chemical Corp., New York, New York.

The molar ratio of triethyl aluminum to $TiCl_3$ in the washed catalyst is in the range 1 to 2.5:1 respectively. A preferred range is 1:1 respectively.

Although the aluminum trialkyl used in the examples was aluminum triethyl, aluminum trialkyls in general, wherein the alkyl groups contain 1 to 8 carbon atoms, are operative both in the washing step and as a portion of the co-catalyst of the instant invention. It is also possible to wash with one aluminum trialkyl in an inert hydrocarbon solvent, for example, triisobutyl aluminum, and thereafter use the solid residue separated from said washing as a catalyst in combination with a different aluminum trialkyl, e.g. aluminum triethyl.

The washing step is conveniently performed at atmospheric pressure at temperatures in the range 20-80° C. Higher temperatures should be avoided since it is possible that the aluminum alkyl will reduce the $TiCl_3$, thereby decreasing the activity of the catalyst.

In performing the instant invention, the catalyst is washed, stored and transferred to the polymerization reactor, under an inert atmosphere to insure that it does not react with oxygen, moisture, or other contaminants. These steps are conveniently performed in what is referred to herein as a "dry box." A "dry box" is merely an enclosed container maintained under a slight pressure of an inert atmosphere equipped with a window and manipulatable gloved rubber arms for performing the necessary operations from outside of said box. In the example given herein, argon is used as the inert atmosphere in the "dry box" and elsewhere when necessary; however, pure lampgrade nitrogen or other noble gases, especially helium, are equally suitable.

The hydrocarbon solvent employed in both the washing step and in the polymerization reaction can be any inert solvent which is liquid under the conditions of temperature and pressure employed. Additionally, in the polymerization step the inert hydrocarbon solvent used should be one which does not interact with the monomer to be polymerized, the catalyst employed, or the growing polymer chain. The preferred solvents are liquid aliphatic hydrocarbons in the alkane and cycloalkane groups. Examples of such solvents include but are not limited to pentane, hexane, heptane, octane, cyclohexane, etc.

In performing the polymerization step it has been found that pressures ranging from atmospheric up to 400 p.s.i. are operable to cause the polymerization reaction to proceed. Preferably, however, the pressure in the polymerization reactor is in the range 130 to 200 p.s.i.

The polymerization reaction is operable at temperatures ranging from 20 to 150° C. or even higher. For practical purposes, a polymerization reaction temperature in the range 60 to 135° C. is employed.

In practicing this invention, the amount of catalyst is not critical. Relatively small amounts are operable to form relatively large amounts of polypropylene. In general, a practical range is 0.006 to 1.0 gram catalyst/gram of propylene polymerized. Even larger amounts of catalyst are operable but occasionally, present a purification problem. The following examples will more clearly explain, but expressly not limit, the invention.

*Example 1*

7 grams of a commercial co-crystallized $TiCl_3$—$AlCl_3$ complex were charged to a Pyrex bottle in a "dry box" maintained under a blanket of argon. A solution of 200 mls. cyclohexane containing 4.01 grams triethyl aluminum were added to the Pyrex bottle and the bottle sealed off with a neoprene rubber disc, and capped. The capped bottle was then removed from the "dry box" and placed in a shaker wherein it was rotated for two hours at 70° C. The bottle was returned to the dry box, uncapped and its contents filtered through a fritted glass tube. The solid residue in the bottle remaining after filtration was washed with an additional 200 ml. cyclohexane and refiltered. The solid residue was left in the dry box to dry at room temperature for 6 hours. The solid residue was collected and stored under argon for use as part of the propylene polymerization catalyst.

*Example 2*

0.57 gram washed $TiCl_3$—$AlCl_3$ complex from Example 1 were charged under nitrogen to a 1 liter stainless steel stirred polymerization reactor. 385 ml. of cyclohexane was added to the reactor. Agitation was commenced and the reactor heated to 111° C. Upon reaching this temperature, 0.35 gram of triethyl aluminum in 1 cc. heptane was added to the reactor under a slight pressure of nitrogen followed by the addition of propylene until the pressure in the reactor was 130 p.s.i. The pressure and temperature were maintained at about 130 p.s.i., and 111–136° C. respectively, during the 1 hour run. Unreacted propylene was then vented, the reactor cooled and the solid polymer product was transferred to a beaker containing a HCl-isopropanol-acetyl acetone wash solution to remove the catalyst therefrom. The polymer product was homogenized in a Waring blender and filtered free of the wash solution. To insure the removal of catalyst residue the product was re-washed twice with 100 ml. isopropanol followed by a water wash to remove residual HCl. The washed solid polypropylene product was dried in an oven under vacuum at 60° C. overnight. The dried product weighed 156 grams. On characterization, the polypropylene product had an isotactic content of 62.5%. The catalyst activity (grams polymer/grams catalyst/reaction time in hours was equal to $$\frac{156}{.92 \times 1} = 170$$

*Example 3*

Using the procedure of Example 2, except that 0.37 gram washed $TiCl_3$—$AlCl_3$ complex from Example 1 and 0.455 gram triethyl aluminum were used as the catalyst resulted in a yield of 113.8 grams dried polypropylene after a 1 hour run. The isotactic content of the polypropylene product was 51.6. Catalyst activity was 138. The following examples will point up the improvement obtained in isotactic content of the polypropylene in the instant invention as compared to an unwashed catalyst containing the same components.

*Example 4*

0.49 gram unwashed commercial co-crystallized $TiCl_3$—$AlCl_3$ complex were charged to a 1 liter stainless steel stirred polymerization reactor under an inert nitrogen atmosphere. 385 ml. of cyclohexane were added to the reactor. Agitation was commenced and the reactor heated to 113.5° C. At this point 0.63 gram triethyl aluminum were added followed by the addition of propylene until the pressure in the reactor was 135 p.s.i. The pressure and temperature were maintained at about 135 p.s.i. and 113.5–121.5° C. respectively during the 1 hour run. Unreacted propylene was vented. The reactor cooled, and the solid polymer product washed as in Example 2. The dried solid polypropylene product weighed 105.4 grams and had an isotactic content of 37.7%. A comparison of Example 2 and Example 4 shows a greater than 60% increase in isotacticity for the polymer prepared by the catalyst of the instant invention. The activity of the catalyst was 94.

The following example shows the increased activity of the catalyst of the instant invention over that of the conventional $TiCl_3$-aluminum trialkyl co-catalyst system as disclosed in the aforementioned Belgian patent.

*Example 5*

0.50 gram commercial $TiCl_3$ were charged under an inert nitrogen atmosphere to a 1 liter stainless steel stirred polymerization reactor. 385 ml. of cyclohexane were added to the reactor and the reactor heated to 109° C. 0.63 gram of triethyl aluminum were then added to the reactor followed by the addition of propylene until the pressure in the reactor was 135 p.s.i. Pressure and temperature were maintained at 135–160 p.s.i. and 109–134° C. during the 1 hour run. The solid propylene polymer product after washing and drying as in Example 2, weighed 52.1 grams and had an isotactic content of 61.5%. The activity of the catalyst was 46. A comparison of catalyst activity in Examples 2 and 5 shows a greater than 250% increase in activity using the washed catalyst of the instant invention over the $TiCl_3$ and aluminum triethyl cocatalyst disclosed in the aforementioned Belgian patent.

The polypropylene obtained by the practice of this invention can be used in the same manner as those prepared by prior art procedures. Its high degree of clarity make it especially useful as film for packaging.

We claim:

1. The method of preparing a catalyst for the polymerization of propylene which comprises in an inert atmosphere washing a co-crystallized $TiCl_3$—$AlCl_3$ complex in a 3.5 to 2.5:1 mole ratio respectively with a solution of triethyl aluminum in an inert hydrocarbon solvent at a temperature in the range 20 to 80° C., and combining the solid residue from said washing with triethyl aluminum in a $TiCl_3$:triethyl aluminum mole ratio of 2.5 to 1:1 respectively.

2. The method according to claim 1 wherein the inert hydrocarbon solvent is cyclohexane.

3. In the method of polymerizing propylene in the presence of a catalyst consisting essentially of a co-crystallized $TiCl_3$—$AlCl_3$ complex in a mole ratio of 3.5 to 2.5 to 1 respectively in combination with an aluminum trialkyl wherein the alkyl groups contain 1 to 8 carbon atoms in a TiCl$_3$:aluminum trialkyl mole ratio of 1:1 to 2.5 respectively, the improvement wherein the TiCl$_3$—AlCl$_3$ complex is washed with a solution of an aluminum trialkyl wherein the alkyl groups contain 1 to 8 carbon atoms in an inert hydrocarbon solvent prior to use with the said first mentioned aluminum trialkyl.

4. The process of polymerizing propylene which comprises subjecting propylene in a liquid hydrocarbon reaction medium at a temperature in the range 20 to 150° C. and a pressure ranging from atmospheric up to 400 p.s.i. to the action of a catalyst consisting essentially of triethyl aluminum in combination with the solid residue obtained from washing in an inert atmosphere a co-crystallized TiCl$_3$—AlCl$_3$ complex in a TiCl$_3$:AlCl$_3$ mole ratio of 3.5 to 2.5:1 respectively with a solution of triethyl aluminum in an inert hydrocarbon solvent, the triethyl aluminum:TiCl$_3$ mole ratio in said catalyst being 2.5 to 1:1 respectively.

5. The process according to claim 4 wherein both the liquid hydrocarbon reaction medium and the inert hydrocarbon solvent are cyclohexane.

References Cited by the Examiner
UNITED STATES PATENTS 3,001,951   9/61   Tornqvist et al. _____ 260—94.9

FOREIGN PATENTS 785,314   10/57   Great Britain.
862,608    3/61   Great Britain.
594,725   11/59   Belgium.

OTHER REFERENCES

Recueil des Brevets d'Invention, November 1959, page 2263.

JOSEPH L. SCHOFER, *Primary Examiner.*

L. H. GASTON, M. LIEBMAN, *Examiners.*